United States Patent
Sinha et al.

(10) Patent No.: US 11,443,136 B2
(45) Date of Patent: Sep. 13, 2022

(54) SYSTEM AND METHOD FOR SIGNAL PRE-PROCESSING BASED ON DATA DRIVEN MODELS AND DATA DEPENDENT MODEL TRANSFORMATION

(71) Applicant: Tata Consultancy Services Limited, Mumbai (IN)

(72) Inventors: Rahul Sinha, Bangalore (IN); Mariswamy Girish Chandra, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 344 days.

(21) Appl. No.: 16/824,112

(22) Filed: Mar. 19, 2020

(65) Prior Publication Data

US 2020/0302228 A1 Sep. 24, 2020

(30) Foreign Application Priority Data

Mar. 20, 2019 (IN) .............................. 201921010964

(51) Int. Cl.
*G06K 9/62* (2022.01)
*G06F 17/16* (2006.01)
(Continued)

(52) U.S. Cl.
CPC ........... *G06K 9/6255* (2013.01); *G06F 17/16* (2013.01); *G06K 9/6262* (2013.01); *G06K 9/6269* (2013.01)

(58) Field of Classification Search
None
See application file for complete search history.

(56) References Cited

U.S. PATENT DOCUMENTS 6,625,569 B2  9/2003  James et al.
6,763,339 B2  7/2004  Fu et al.
(Continued)

FOREIGN PATENT DOCUMENTS

CN  106778592    5/2017
CN  106777318 B  * 12/2019  ........... G06F 16/325
(Continued)

OTHER PUBLICATIONS

Guo et al., Graph Laplacian Spectrum and Primary Frequency Regulation, IEEE Conference on Decision and Control, pp. 158-165 (Year: 2018).*

*Primary Examiner* — Mohammed Rachedine
(74) *Attorney, Agent, or Firm* — Finnegan, Henderson, Farabow, Garrett & Dunner LLP

(57) ABSTRACT

This disclosure relates generally to method for signal pre-processing based on a plurality of data driven models and a data dependent model transformation. The method includes (a) receiving, a raw signal as an input; (b) learning, a set of representational basis from the received raw signal, wherein the set of representational basis comprises a plurality of orthonormal vectors; (c) selecting, at least one orthonormal vector from the plurality of orthonormal vectors, (d) determining, a structure of the plurality of dictionary atoms, wherein structure of the plurality of dictionary atoms corresponds to a graph structure represented as a Laplacian matrix (L); (e) integrating, the graph structure as a structure of the set of representational basis to obtain a reconfigured data model; and (f) reconstructing, using the reconfigured data model to obtain a denoised signal, wherein at least one of constraints on a optimization problem corresponds to desired spectral and topological structure.

20 Claims, 9 Drawing Sheets

(51) Int. Cl.
    *G06F 17/10*     (2006.01)
    *G06N 5/02*     (2006.01)
    *G06N 5/04*     (2006.01)
    *G06N 20/00*     (2019.01)

(56) References Cited

U.S. PATENT DOCUMENTS

| | | |
|---|---|---|
| 7,558,622 B2 | 7/2009 | Tran |
| 8,433,395 B1 | 4/2013 | Brockway et al. |
| 10,540,813 B1 * | 1/2020 | Uhlenbrock .......... G06K 9/6276 |
| 10,685,285 B2 * | 6/2020 | Simard ................ G06N 3/0454 |
| 2017/0286811 A1 * | 10/2017 | Shafer .................... G06V 10/84 |
| 2017/0360377 A1 * | 12/2017 | Rossi ................... A61B 5/7232 |
| 2018/0350088 A1 * | 12/2018 | Dou ........................ G06T 7/596 |
| 2019/0318256 A1 * | 10/2019 | Wei ....................... G06F 16/313 |
| 2019/0354832 A1 * | 11/2019 | Bronstein .............. G06F 17/16 |

FOREIGN PATENT DOCUMENTS

| | | | | |
|---|---|---|---|---|
| CN | 111091137 A | * | 5/2020 | |
| CN | 113164056 A | * | 7/2021 | |
| CN | 108665548 B | * | 1/2022 | ............. G06T 17/20 |
| CN | 108960341 B | * | 3/2022 | ........... G06K 9/6215 |

* cited by examiner

SYSTEM AND METHOD FOR SIGNAL PRE-PROCESSING BASED ON DATA DRIVEN MODELS AND DATA DEPENDENT MODEL TRANSFORMATION

PRIORITY CLAIM

This U.S. patent application claims priority under 35 U.S.C. § 119 to: India Application No. 201921010964, filed on Mar. 20, 2019.

TECHNICAL FIELD

This disclosure relates generally to data processing, and, more particularly, to system and method for signal pre-processing based on data driven models and data dependent model transformation.

BACKGROUND

There is a pressing need for sophisticated computational tools for automating data pre-processing, management, and analytics, including scalable tools for storing, indexing, annotating, retrieving, organizing, assessing reliability of, and analyzing data. Typical applications include data processing in healthcare, transportation and manufacturing. Frameworks are needed that organize: (a) hypotheses that are under consideration, (b) data that supports them, (c) models that have been created from the data, and (d) the hypotheses resulting from the models. However, connection between domain knowledge and the analytics that can support inferences on data is often not thoughtfully captured and preserved in existing computational frameworks. The separation between knowledge and data makes it difficult for scientists to keep track of what hypotheses have been considered, what data supports them, what models have been created from the data, and how new hypotheses are formulated from those models.

As more complex data becomes available with increasing volume, variety, and velocity, exploration of models becomes unmanageable. New computational approaches are needed to bridge the gap between knowledge and data and exploit them to facilitate scientists' understanding of complex phenomena. Many efforts are being made to analyze data using commercially available tools or by developing an analysis tool that meets the requirements of a particular application. Some of these efforts have ignored the fact that problems exist with real world data and some form of data preprocessing is usually required to intelligently analyze the data. This means that commercial or research tools should provide data preprocessing facilities to be used before or during the actual data analysis process.

Data preprocessing is a time-consuming task. Growing amounts of data produced by modern process monitoring and data acquisition systems has resulted in correspondingly large data processing requirements and, therefore, efficient techniques for automatic data preprocessing are important. Data preprocessing may be performed on the data for the following reasons: a. solving data problems that may prevent us from performing any type of analysis on the data, b. understanding the nature of the data and performing a more meaningful data analysis, and c. extracting more meaningful knowledge from a given set of data.

Traditional signal processing approaches typically only look at input/output relations. A holistic systems perspective which takes into account the end goal in mind for designing pre-processing techniques is not taken. This leads to a design of algorithms optimized only for a certain performance metric. The design of algorithms do not take into account certain domain dependent bounding constraints on the design objective, which can lead to a completely different solution when compared to a plain unconstrained design objective.

SUMMARY

Embodiments of the present disclosure present technological improvements as solutions to one or more of the above-mentioned technical problems recognized by the inventors in conventional systems. For example, in one aspect, processor implemented method for signal pre-processing based on a plurality of data driven models and a data dependent model transformation is provided. The processor implemented method includes (a) receiving, a raw signal as an input; (b) learning, a set of representational basis from the received raw signal; (c) selecting, at least one orthonormal vector from the plurality of orthonormal vectors; (d) determining, a structure of the plurality of dictionary atoms; (e) integrating, the graph structure as a structure of the set of representational basis to obtain a reconfigured data model; and (f) reconstructing, using the reconfigured data model to obtain a denoised signal. In an embodiment, set of representational basis comprises a plurality of orthonormal vectors. In an embodiment, at least one selection of the orthonormal vector corresponds to a plurality of dictionary atoms, based on a domain dependent time-frequency energy distribution pattern. In an embodiment, structure of the plurality of dictionary atoms corresponds to a graph structure represented as a Laplacian matrix (L). In an embodiment, at least one of constraints on an optimization problem corresponds to desired spectral and topological structure.

In an embodiment, the structure may correspond to a spectral structure and topological structure of the plurality of dictionary atoms and the topological structure of the synthesis coefficients. In an embodiment, a structure of a reconstructed signal may be determined based on at least one of (a) time-frequency pattern, (b) graph structured dictionary atoms and combination thereof. In an embodiment, a penalty factor may determine the statistical, spectral and topological structure of reconstructed signal encoded in factor lambda $\lambda_2$. In an embodiment, the penalty factor may control a tradeoff between approximation capability of the dictionary and structure inducing strength of a graph Laplacian penalty. In an embodiment, reconstruction of the signal may be performed by estimating graph structured coefficients of a graph and time-frequency structured dictionary. In an embodiment, the denoised signal may be validated if ratio of the sum of the major eigenmodes to the sum of the minor eigenmodes is comparable to a domain dependent threshold for clean signals in the domain.

In another aspect, there is provided a processor implemented system to signal pre-process based on a plurality of data driven models and a data dependent model transformation. The system comprises a memory storing instructions; one or more communication interfaces; and one or more hardware processors coupled to the memory via the one or more communication interfaces, wherein the one or more hardware processors are configured by the instructions to: (a) receive, a raw signal as an input; (b) learn, a set of representational basis from the received raw signal; (c) select, at least one orthonormal vector from the plurality of orthonormal vectors; (d) determine, a structure of the plurality of dictionary atoms; (e) integrate, the graph structure as a structure of the set of representational basis to obtain a reconfigured data model; and (f) reconstruct, using the reconfigured data model to obtain a denoised signal. In an embodiment, set of representational basis comprises a plurality of orthonormal vectors. In an embodiment, at least one selection of the orthonormal vector corresponds to a plurality of dictionary atoms, based on a domain dependent time-frequency energy distribution pattern. In an embodiment, structure of the plurality of dictionary atoms corresponds to a graph structure represented as a Laplacian matrix (L). In an embodiment, at least one of constraints on an optimization problem corresponds to desired spectral and topological structure.

In an embodiment, the structure may correspond to a spectral structure and topological structure of the plurality of dictionary atoms and the topological structure of the synthesis coefficients. In an embodiment, a structure of a reconstructed signal may be determined based on at least one of (a) time-frequency pattern, (b) graph structured dictionary atoms and combination thereof. In an embodiment, a penalty factor may determine the statistical, spectral and topological structure of reconstructed signal encoded in factor lambda $\lambda_2$. In an embodiment, the penalty factor may control a tradeoff between approximation capability of the dictionary and structure inducing strength of a graph Laplacian penalty. In an embodiment, reconstruction of the signal may be performed by estimating graph structured coefficients of a graph and time-frequency structured dictionary. In an embodiment, the denoised signal may be validated if ratio of the sum of the major eigenmodes to the sum of the minor eigenmodes is comparable to a domain dependent threshold for clean signals in the domain.

In yet another aspect, there are provided one or more non-transitory machine readable information storage mediums comprising one or more instructions which when executed by one or more hardware processors causes (a) receiving, a raw signal as an input; (b) learning, a set of representational basis from the received raw signal; (c) selecting, at least one orthonormal vector from the plurality of orthonormal vectors; (d) determining, a structure of the plurality of dictionary atoms; (e) integrating, the graph structure as a structure of the set of representational basis to obtain a reconfigured data model; and (f) reconstructing, using the reconfigured data model to obtain a denoised signal. In an embodiment, set of representational basis comprises a plurality of orthonormal vectors. In an embodiment, at least one selection of the orthonormal vector corresponds to a plurality of dictionary atoms, based on a domain dependent time-frequency energy distribution pattern. In an embodiment, structure of the plurality of dictionary atoms corresponds to a graph structure represented as a Laplacian matrix (L). In an embodiment, at least one of constraints on an optimization problem corresponds to desired spectral and topological structure.

In an embodiment, the structure may correspond to a spectral structure and topological structure of the plurality of dictionary atoms and the topological structure of the synthesis coefficients. In an embodiment, a structure of a reconstructed signal may be determined based on at least one of (a) time-frequency pattern, (b) graph structured dictionary atoms and combination thereof. In an embodiment, a penalty factor may determine the statistical, spectral and topological structure of reconstructed signal encoded in factor lambda $\lambda_2$. In an embodiment, the penalty factor may control a tradeoff between approximation capability of the dictionary and structure inducing strength of a graph Laplacian penalty. In an embodiment, reconstruction of the signal may be performed by estimating graph structured coefficients of a graph and time-frequency structured dictionary. In an embodiment, the denoised signal may be validated if ratio of the sum of the major eigenmodes to the sum of the minor eigenmodes is comparable to a domain dependent threshold for clean signals in the domain.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
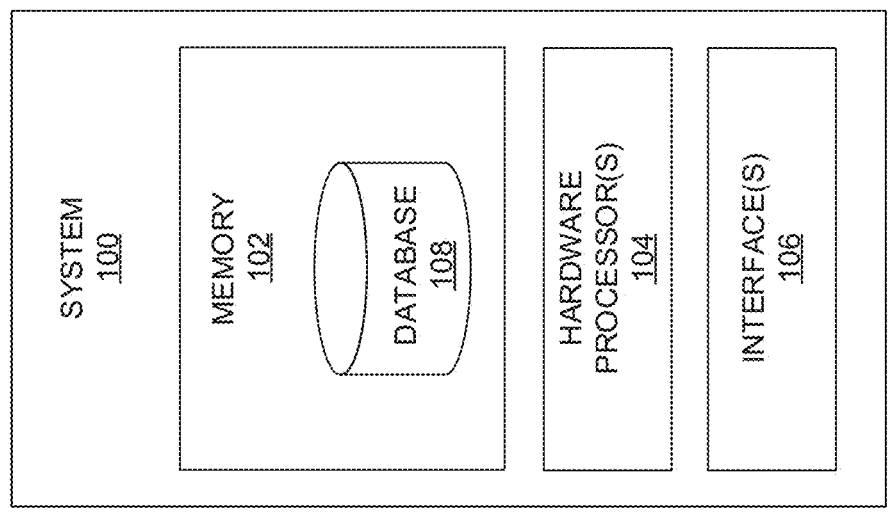
FIG. 1 illustrates a block diagram of a system for signal pre-processing based on data driven models and data dependent model transformation according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments of the present disclosure provide a system and method for pre-processing including anomaly removal and denoising of analog signals. Domain knowledge is incorporated into the formulation of plurality of algorithms. The domain knowledge is obtained from expert knowledge of features of signals but not limited to which are encountered in a healthcare, a manufacturing, and a machinery monitoring. Data driven models are used which are based on a priori domain knowledge. Domain knowledge related to signals for a given application can be captured based on at least one of: (a) a knowledge of dynamics of a system/physical process generating signal, (b) a knowledge of statistical properties of the signal, (c) a knowledge of topological properties of the signal in terms of a connected graph, (d) a knowledge of signal energy distribution over time-frequency plane, indicative of the spectral properties of the signal, and (e) combination thereof.

Data driven modeling in which signals are represented in terms of the data driven models, in contrast to apriori models (e.g. Fourier, Wavelet). In an embodiment, the data driven models are adaptive. The model dimension and model complexity can be changed to achieve a balance between representational accuracy and computational complexity in calculating inferences, while preserving essential features of the signal. Incorporating domain knowledge into the data driven models in which re-structuring/reconfiguration of data driven models is performed with the domain dependent features to be preserved in the signal. In an embodiment, level of reconfiguration can be controlled to achieve desired statistical accuracy of inferences on the signal.

Referring now to the drawings, and more particularly to FIG. 1 through 5D, where similar reference characters denote corresponding features consistently throughout the figures, there are shown preferred embodiments and these embodiments are described in the context of the following exemplary system and/or method.

FIG. 1 illustrates a block diagram of a system 100 for signal pre-processing based on data driven models and data dependent model transformation according to embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the plurality of parameters are specific to an entity (e.g., user, machine, and the like). Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
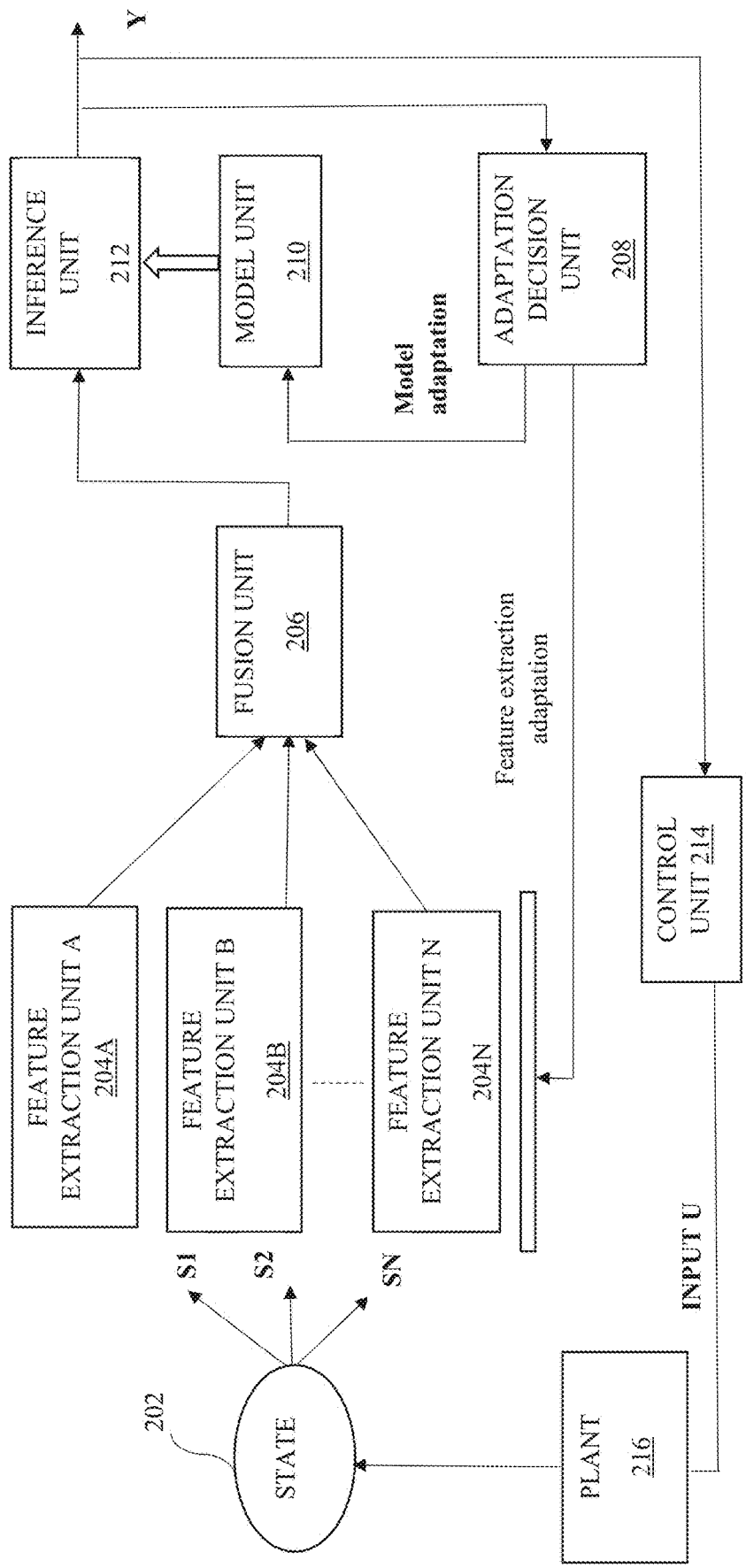
FIG. 2 is an exemplary signal pre-processing system for signal pre-processing based on data driven models and data dependent model transformation according to embodiments of the present disclosure.

FIG. 2, with reference to FIG. 1, illustrates an exemplary signal pre-processing system 200 for signal pre-processing based on data driven models and data dependent model transformation according to embodiments of the present disclosure. The signal pre-processing system 200 which includes a plurality of states 202, a plurality of feature extraction unit 204A-204N, a fusion unit 206, an adaptation decision unit 208, a model unit 210, an inference unit 212, a control unit 214, and a plant 216. In an embodiment, the plant 216 is an entity which has a state space. The states are corresponding to the multiple features of a signal e.g., S1, S2, SN. In an embodiment, the plant 216 is a model of the signal, which can be controlled. In an embodiment, a fusion of features is taken, to refine an apriori model for obtaining structured model. The structured model is configured to make the right inference. In an embodiment, a decision for adaptation of the model can be based on domain knowledge. The output Y is used by the control unit 214 to choose suitable inputs to the plant 216, which can control the states of the plant 216 and the corresponding system parameters. In an embodiment, the models are learned: (a) data models in terms of a dictionary, (b) topological models in terms of a graph. Further, the dictionary and the graph model are configured to precondition the raw signal (i.e. denoising and anomaly removal). In an embodiment, this approach can be applied to multiple domains and applications.

In an embodiment, models represent a plurality of data models (dictionary), a plurality of structural models (graph), a plurality of measurement models and a plurality of models of the underlying states of the system (dynamical model). In another embodiment, the models can be updated/adapted with new knowledge using a model adaptation feedback. The output Y is used by the control unit 214 to choose suitable inputs to the plant 216, which can control the states of the plant (the corresponding system parameters) 216.

In an embodiment, dynamics of a signal is modeled using a linear dynamical system model and deriving major Eigen modes of the system. In an embodiment, the method used is a dynamic mode decomposition. A ratio of sum of major Eigen modes to sum of minor Eigen modes is reflective of level of restructuring required in the data model for denoising and anomaly removal.

The signals are non-stationary and include an energy distributed over the time-frequency plane with a certain structure. The distribution of the energy can be quantified based on an entropy measure. A time-frequency entropy measure is a measure of complexity of the signal's energy distribution over the TF plane. In an embodiment, the measure of entropy is a numerical measure to be preserved in the signal to be reconstructed from the restructured data model. Data driven representational models are derived based on one or more dictionary learning techniques. In an embodiment, a model representational accuracy and model complexity can be adapted to the requirements of preserving essential features of the signal and the statistical accuracy of the inferences which can be made on the reconstructed signal.

In an embodiment, the derived data models are reconfigured to incorporate domain dependent knowledge in at least one of following steps: (a) a topological structure in terms of a graph Laplacian is utilized as a regularization penalty when refining the original data model, (b) an entropy measure based on the energy distribution is computed over the dictionary atoms of the original data model. In an embodiment, dictionary atoms with a certain entropy measure are selected.

Subsequently, the reconfigured data model is configured to reconstruct the signal. The reconstruction is formulated as an optimization problem. In an embodiment, constraints on the optimization problem lead to a signal reconstruction with reduced anomalies and noise.

In an embodiment, to verify whether the denoising and anomaly removal are succeeded, a dynamic mode decomposition is utilized to estimate Eigenmodes of the reconstructed signal. If the ratio of sum of major Eigenmodes to the sum of minor Eigenmodes is comparable to a domain dependent threshold, and noise, and anomalies can be considered removed.

In an embodiment, a Locally linear embedding (LLE) on the reconstructed signal matrix is performed and projected to a reduced dimension space in order to verify whether the reconstructed signal preserves essential topological features of the intended signal. In an embodiment, a graph structure is learnt on the reduced dimension space. An adjacency matrix of the graph provides the topological connectivity structure of the reconstructed signal. The connectivity structure is indicative of the dominant eigenmodes of the signal. For example, the learnt graph for the reduced dimension representation includes a number of connected sub-graphs corresponding to the number of dominant eigenmodes of the signal.

In an embodiment, inferences on data are based on apriori models developed by domain experts. In an embodiment, the models are defined by a structure and a set of parameters. The model structure captures the information complexity in the data. For example, a data model is defined in terms of a dictionary of atomic elements. The elements are defined in terms of dimensions of each element and cardinality (number of) of the atomic elements. In capturing structure of analog signals which are generated by complex systems of physical processes, features can be identified to capture the structure in the signal. For example, features may include at least one of: (a) a distribution of the energy of the signal over the time-frequency plane, (b) a connectivity structure in terms of a graph topological structure of the signal, and combination thereof.

In an embodiment, the signal model needs to be derived which can aid in making the intended inferences on the signal. An inference guided model derivation is required. The inferences can include a) estimation, b) detection, c) clustering/classification, d) analysis/synthesis.

In an exemplary scenario, in process of making inferences such as estimation, detection, clustering or classification, may require that the models of the signal are developed taking into account what critical features (statistical, spectral, structural) of the signal need to be captured. The template signal includes a certain energy distribution over the time-frequency plane and have a certain connectivity structure based on a graphical representation. For example, considering a test noisy signal, the idea is to develop a model which can aid in denoising of this signal, without distorting its essential features and corresponds to a synthesis model (i.e. aids in synthesizing a de-noised signal). An apriori model is considered, observe the data/signal and derive a posterior model which incorporates an inference relevant structure (e.g., a time-frequency property and graph property). In an embodiment, the essential features of the given test signal are preserved, while leading to the right inference (i.e. from the de-noised signal). In an embodiment, multiple models are combined to incorporate a structure on data models e.g., a data model may need to be structured for denoising/anomaly removal, by using a graph model. The model structuring is performed by combining the two models (i.e., one model acting as a penalty on the other).

In an embodiment, for signal processing applications, models are derived and are reconfigured/restructured based on end goal, and constraints dependent on the domain of application. In an embodiment, the models include methods and operators. A reconfiguration of the models is driven by at least one of a parameters, a rules and a contexts. For example, one or more rules which are predefined as mentioned below:

(a) Choice rules which utilize the values of context fields, data definitions, constraints in a request, etc. to select an operator from among one or more choices available.

(b) Initialization rules which formalize rough initial guesses that a specialist makes before starting a signal/data analysis task.

(c) Adjustment rules are defined for operators which have adjustable parameters. Step sizes for parameters are carefully chosen hence change in behavior of the algorithm is neither too sudden nor too gradual.

(d) Evaluation rules in which performance evaluation methods for algorithms and algorithm portfolios which enable an interpretation are developed.

In an embodiment, algorithms are designed for signal pre-processing which use models (methods and operators) which are dependent on parameters and can reconfigure/restructure the models based on rules and the domain context. In an embodiment, the reconfiguration and restructuring are enabled by monitoring conditions on the problem state, domain knowledge and data.

The signal pre-processing system 200 is configured to reconfigure/restructure signal representational models for pre-processing of signals. The steps involved in pre-processing of signals comprises of:

a. Signal Representational Models:

In an embodiment, a data driven approach to learning a signal subspace for analysis and synthesis of signals is the KSVD algorithm. The K-SVD approach solves the optimization problem:

$$D_C, X_C = \arg\min_{D,X} \|Y - D \cdot X\|_F + \lambda \|X\|_F \qquad (1)$$

$D_C \in R^{n*K}$ $D_c$ is a dictionary of K orthonormal atoms learnt from the signal.

$Y \in R^{n*P}$ is the matrix of raw test signal measurements to be analyzed.

$X_C \in R^{K*P}$ is the matrix of synthesis coefficients which can be used to synthesize the signal.

b. Structural Model:

In an embodiment, to impose a structure on the synthesis model $D_C$, a graph topological.

For example, let K measurements of n dimensions each of the distortion free i.e. template signal be represented by the matrix $Y_d \in R^{n*K}$. These multiple measurements can be characterized by a graph Laplacian $L \in R^{K*K}$. The Laplacian can be learnt by solving the optimization problem:

$$\arg\min_L \text{trace}(Y_d \cdot L \cdot Y_d^T) + \lambda_1 \|L \cdot 1 - 0\|_F \text{ subject to } L = L^T \qquad (2)$$

where $1 \in R^{K*1}$ is an all one's column vector and $0 \in R^{K*1}$ is an all zeros column vector.

c. Restructuring of Signal Representational Model:

1). Global Structure Constraint:

In an embodiment, to impose a graph structure on the dictionary, the following optimization problem is solved $$\arg\min_D \|D_C - D\|_F + \lambda \cdot \text{trace}(D \cdot L \cdot D^T) \qquad (3)$$

The analytical solution to the above objective is given by:

$$D = (I + \lambda L)^{-1} D_C \quad (4)$$

In an embodiment, choice of the regularizer parameter $\lambda$ is important and a larger value enforces a stronger structure. This structure enforcement increases the coherence of the dictionary D. The coherence of a dictionary is given by the maximum value of the elements of the Gram matrix:

$$G = D^T \cdot D$$

In an embodiment, imposing a Laplacian penalty on the learnt dictionary atoms induces a correlation between the dictionary atoms, which is dependent on correlation between the template signal measurements on which the Graph Laplacian as learnt. In an embodiment, the choice of the penalty function determines the balance between the global structure and local structure of the signal to be synthesized. The number of dictionary atoms also plays an important role in the signal approximation. In an embodiment, an over complete dictionary with larger number of atoms than the dimensionality of the dictionary atom can better capture the correlation structure of the signal. However, an over complete dictionary tends to have a higher coherence, leading to changes in the local structure of the synthesized signal.

2). Local Structure Constraint:

In an embodiment, an achievable balance is enforced on the data model (a global structure vs. a local structure), and are independently smoothen out the local variations introduced by the higher coherence in the data model by using a coherence reduction technique on the dictionary $D_C$ followed by a graph Laplacian penalty on the synthesis coefficients of the newly obtained coherence reduced dictionary.

In an embodiment, once coherence of the dictionary $D_C$ is reduced, the synthesis coefficients of the coherence reduced dictionary is re-estimated by imposing a graph structural penalty on the coefficients. Considering, the coherence reduced dictionary be represented by $D_C^R$. The new Dictionary is then utilized to obtain the synthesis coefficients by solving the following optimization problem:

$$X_1 = \arg\min_X \|Y - D_C^R \cdot X\|_F + \lambda_3 \cdot \text{trace}(X^T \cdot L \cdot X) \quad (5)$$

The final signal is reconstructed using:

$$Y_1 = D_C^R \cdot X_1 \quad (6)$$

In an embodiment, a critical choice are made on the following design metrics: (i) The cardinality K and dimensionality n of the data model (Dictionary $D_C^R$), (ii) number of nodes K, in the graph which captures the correlation structure of the signal effectively, (iii) Lagrangian penalty weight on the Laplacian cost function when imposing a graph structure on the dictionary to obtain $D_L$, (iv) The Lagrangian penalty weight on the Laplacian cost function when imposing a graph structure on the synthesis coefficients.

3. Anomaly/Outlier Constraints Based on Signal Energy Distributions:

There is a possibility for unexpected waveform structures to be present in the reconstructed signal even after applying the global and local structural constraints on the dictionary and corresponding synthesis coefficients by the graph Laplacian. The waveform structures include features or properties close to the valid signal structures and are not taken as outliers when solving optimization problems to reduce the noise or outliers. To address this issue, a careful selection of the dictionary atoms based on the time-frequency entropy is performed. The entropy of the distribution of the energy of the selected subset of atoms should closely approximate the distribution of a template signal (i.e., a clean signal without any anomalies or outliers).

The distribution of the signal energy over the time-frequency plane is given by:

$$W_X(t, f) = \int_\tau X_c\left(t + \frac{\tau}{2}\right) X_c\left(t - \frac{\tau}{2}\right) e^{j2\pi f \tau} d\tau \quad (7)$$

$X_c(t)$ is the complex analytic form of the signal x (t).

a. Signal Model Reconfiguration (Dictionary Atom Selection):

In an embodiment, a dictionary of atoms $D_C^R$ is computed on the test signal represented by multiple measurement matrix Y.

$$D^R, A = \arg\min_{D,A} \|Y - D \cdot A\|_F + \lambda \cdot \|A\|_F$$

The dictionary of atoms $D_C^R \in R^{n*K}$ is a linear signal space. The time-frequency energy distribution of the linear signal space can be computed by averaging over all elements i.e., atoms of the dictionary.

In an embodiment, a Wigner Ville distribution (WVD) of each of the k atoms is computed based on the learned dictionary atoms. This is denoted as:

$$W_d^i(t,f) \; i=1,2,\ldots,k \quad (8)$$

An average WVD is computed as:

$$W_d(t, f) = \frac{\sum_i W_d^i(t, f)}{K} \quad (9)$$

In an embodiment, the averaged WVD is denoted as Wigner Ville Spectrum (WVS).

In an embodiment, a normalized WVD is computed, $$W_d^N(t, f) = \frac{W_d(t, f)}{\iint_{t,f} W_d(t, f)} \quad (10)$$

Further, a TF entropy of the energy distribution of the dictionary atoms is computed as:

$$H_a(X) = \frac{1}{1-a} \log_2 \iint_{t,f} \left( \frac{W_d^N(t, f)}{\iint_{U,V} W_d^N(U, V) du dv} \right)^a \quad (11)$$

In an embodiment, to ensure that the WVS of the reconstructed signal is a good approximation of the WVS of the desired template signal, atoms from the dictionary are selected which include a TF Entropy less than a pre-defined threshold.

In an embodiment, for a template signal (i.e., without anomalies/outliers) represented by $Y_d \in R^{n*K}$, the normalized WVS is computed, which is represented as $W_y^d(t,f)$. The goal is to ensure that:

$$W_y^d(t,f) \approx W_d^N(t,f) \quad (12)$$

In an embodiment, this approach implies that the TF energy distribution of the template signal should be close (i.e., from a statistical distance perspective) to the TF energy distribution of the atoms of the dictionary. Once atoms with a specified range of TF entropy measures are selected, a new dictionary with a reduced subset of atoms is obtained and represented as $D_C^E$.

(b) In an embodiment, reconstruction of signal is performed after selecting dictionary atoms with a TF Renyi entropy lower than a pre-defined threshold, to obtain a modified set of dictionary atoms: $D_C^E$. The new dictionary includes plurality of dimensions $D_C^E \in R^{n*K1}$ with a number of atoms K1<K.

In an embodiment, an optimization problem is solved based on the selected dictionary atom set to learn the corresponding synthesis coefficients:

$$A_E = \arg\min_A \|Y - D_C^E \cdot A\|_F + \lambda_4 \cdot \|A\|_F \quad (13)$$

The signal is reconstructed as:

$$Y_E = D_C^E \cdot A_E \quad (14)$$

The reconstructed signal $Y_E$ is an approximation to the raw test signal Y with anomalies and outliers removed/reduced in magnitude.

Signal Structure and property-based verification of denoising/anomaly reduction:

In an embodiment, once a pre-processing strategy is deployed, there is a possibility that results or inferences on the reconstructed signal do not match user expectations. There is a need to systematically model the entire procedure to enable key insights into why results do not match expectations. To address this, a Process-Structure-Property-Performance map for signals is defined.

A Process is a portfolio of algorithms (consisting of learning the dictionary, and re-structuring based on spectral and topological properties). The Process leads to a structure in the reconstructed signal. The structure is in terms of statistical, spectral and topological features.

The structure imposed on the signal leads to well defined properties of the signal in terms of Accuracy, Consistency, Completeness, Validity and Density. The properties then determine the performance of inferences on the processed signal. The performance is on estimation, detection, clustering and classification procedures.

The forward path in the Process-Structure-Property-Performance (PSPP) model is based on domain knowledge. In an embodiment, if results obtained on Performance do not match user expectations, then a trace back operation is performed on the PSPP model. Once the Performance metrics are computed, an attempt is made to find appropriate parameters and variables in the prior block of Property, Structure and Process which can be modified systematically. In an embodiment, Process-Structure-Property-Performance model is utilized for traversing the reverse path.

TABLE 1a illustrates a process-structure mapping for analog signals as mentioned below:

TABLE 1A

| Process category | Affected Structure |
|---|---|
| Denoising, Sampling rate conversion, Missing value imputation | Statistical (Distribution, covariance) |
| Denoising, Anomaly removal, Sampling rate conversion, Missing value imputation | Spectral (Energy distribution over the time-frequency plane) |
| Dimensionality reduction | Topological (Graph edge connectivity) |
| Denoising, Anomaly removal | Dynamical (Temporal evolution of the signal) |

In an embodiment, there exists a many to one mapping between Process and Structure. Many process categories can lead to an affected structure.

TABLE 1b illustrates structure-property/quality map as mentioned below:

TABLE 1B

| Structure | Quality Dimension/Property |
|---|---|
| Statistical (Distribution, covariance) | Consistency Completeness Density |
| Spectral (Energy distribution over the time-frequency plane) | Validity Completeness Density |
| Topological (Graph edge connectivity) | Consistency |
| Dynamical (Temporal evolution of the signal) | Accuracy |

In an embodiment, there is a one to many mapping between structure and property. In terms of signals/data, the property can be quantified in terms of quality dimensions.

TABLE 1c illustrates a signal quality dimensions and their evaluations as mentioned below:

TABLE 1C

| Quality Dimension/Property | Numeric evaluation |
|---|---|
| Accuracy: | Accuracy based on a dynamical evolution model Model random signal as a dynamical system. Approximate the non-linear dynamical system as a linear system. Compute the Ratio of major to minor eigenmodes of the approximate linear system. |
| Validity | Spectral validity Compute energy distribution over TF plane for all measurements: A TF Entropy measure over this energy distribution indicates a measure of spectral validity of the test signal. |
| Consistency | Statistical, Spectral and Topological structure-based consistency 1. Statistical: Compute sum of singular values of the covariance matrix of the signal. 2. Spectral: Compute the area under the Time-Frequency correlation region of the test signal 3. Topological: Compute the projection of the test signal on the Graph Laplacian: |
| Density | Compute the temporal dispersion of the TF correlation covering the highest magnitude of correlation, The effective sampling rate of the ample the signal can be given as. This is a measure of Density |

(a) Upon performing a mapping between the process, structure, property and performance, the map is configured to determine properties of the processed signal to verify whether the processing satisfies end objectives of the user (to obtain a well-conditioned signal useful for making domain relevant inferences). If the performance does not meet end user expectations, the process-structure-property-performance map is utilized to decide on how to modify the process parameters so that the expected structure and property can be obtained, for a performance requirement.

Figure 3:
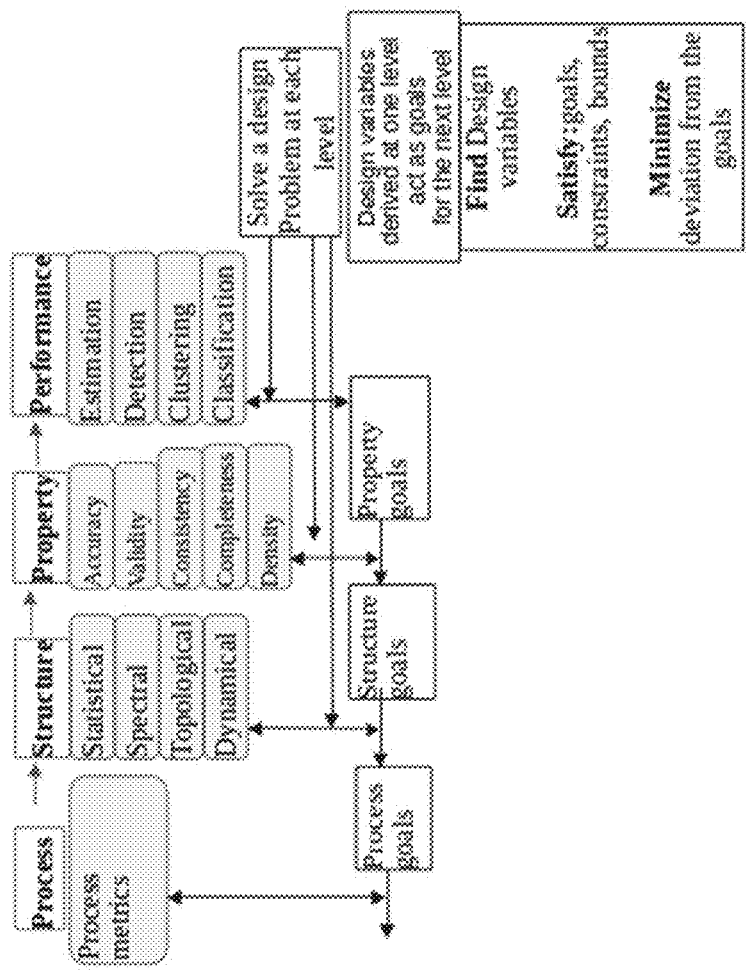
FIG. 3 is a block diagram illustrates a feedback structure for making decisions on a re-parameterization of the process according to embodiments of the present disclosure.

With reference to FIG. 3, a block diagram illustrates a feedback structure for making decisions on a re-parameterization of the process according to embodiments of the present disclosure. In an embodiment, decision making system to enable a feedback from the performance back to Property, Structure and Performance, to enable a reconfiguration of the process in case Performance does not meet user expectations. Considering the reconstructed signal based on the apriori graph structured representational model, inferences are made as estimation of parameters, detection of events, clustering and classification of multi-dimensional measurements. Each of the inferences includes a numerical measure of performance. If the performance measure of inferences is not acceptable to the user for a given application, there is a need to modify the restructuring of the representational model. The present embodiments provide in process of restructuring, a formal method in terms of a Process-Structure-Property-Performance map for analog signals.

With reference to FIG. 3, once performance metrics are observed, and found unacceptable, a design problem is solved in terms of a compromise Decision Support (cDSP). The solution of the design problem at the performance level is in terms of design variables, which become goals for the previous level of Property. Again a design problem solved at the Property level gives optimal design variables which become goals for the Structure level. In an embodiment, as observed, the structure is either in terms of statistical, spectral or topological structure.

A design problem solved at the structure level provides design variables which act as goals for the Process level. In an embodiment, an optimal parameters for the process which when applied to the signal lead to appropriate structure, property and performance on inferences for an application.

Figure 4A:
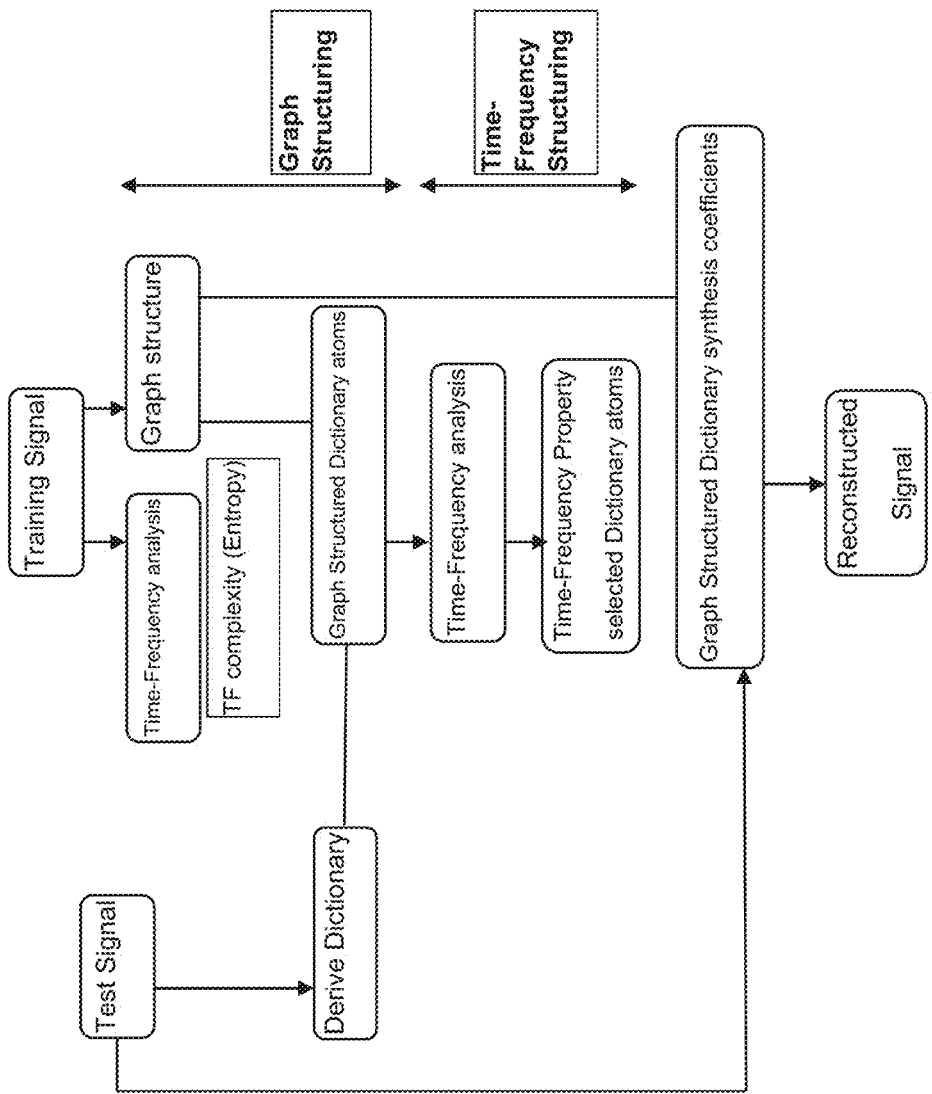
FIGS. 4A & 4B illustrates a flow diagram method for signal pre-processing based on a plurality of data driven models and a data dependent model transformation according to embodiments of the present disclosure.
Figure 4B:
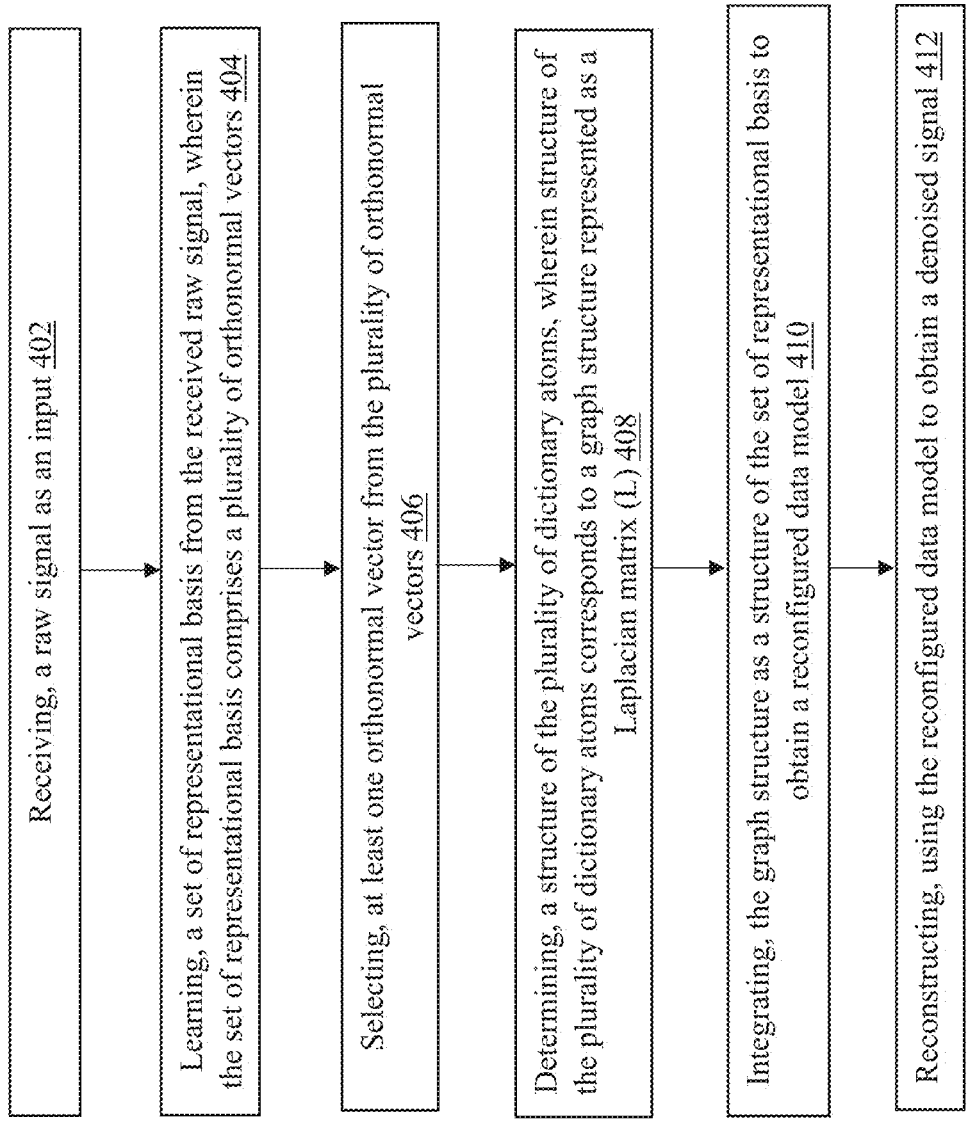

FIGS. 4A & 4B illustrates a flow diagram method for signal pre-processing based on a plurality of data driven models and a data dependent model transformation in according to embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description.

The steps of the method of the present disclosure will now be explained with reference to the components of the system 100 as depicted in FIG. 1. In an embodiment of the present disclosure, at step 402, the one or more hardware processors 104, a raw signal as an input is received. In an embodiment of the present disclosure, at step 404, the one or more hardware processors 104, a set of representational basis is learned from the received raw signal. In an embodiment, the set of representational basis comprises a plurality of orthonormal vectors. In an embodiment of the present disclosure, at step 406, the one or more hardware processors 104, at least one orthonormal vector is selected from the plurality of orthonormal vectors. In an embodiment, at least one selection of the orthonormal vector corresponds to a plurality of dictionary atoms, based on a domain dependent time-frequency energy distribution pattern. In an embodiment of the present disclosure, at step 408, the one or more hardware processors 104, a structure of the plurality of dictionary atoms is determined. In an embodiment, structure of the plurality of dictionary atoms corresponds to a graph structure represented as a Laplacian matrix (L). In an embodiment of the present disclosure, at step 410, the one or more hardware processors 104, the graph structure is integrated with a structure of the set of representational basis to obtain a reconfigured data model. In an embodiment of the present disclosure, at step 412, the one or more hardware processors 104, reconstructing, using the reconfigured data model to obtain a denoised signal. In an embodiment, at least one of constraints on an optimization problem corresponds to desired spectral and topological structure.

In an embodiment, the structure corresponds to a spectral structure and topological structure of the plurality of dictionary atoms and the topological structure of the synthesis coefficients. In an embodiment, a structure of a reconstructed signal is determined based on at least one of (a) time-frequency pattern, (b) graph structured dictionary atoms and combination thereof. In an embodiment, a penalty factor determines the statistical, spectral and topological structure of reconstructed signal encoded in factor lambda $\lambda_2$. The penalty factor controls a tradeoff between approximation capability of the dictionary and structure inducing strength of a graph Laplacian penalty. In an embodiment, reconstruction of the signal is performed by estimating graph structured coefficients of a graph and time-frequency structured dictionary. The denoised signal is validated if ratio of the sum of the major eigenmodes to the sum of the minor eigenmodes is comparable to a domain dependent threshold for clean signals in the domain.

Figure 5A:
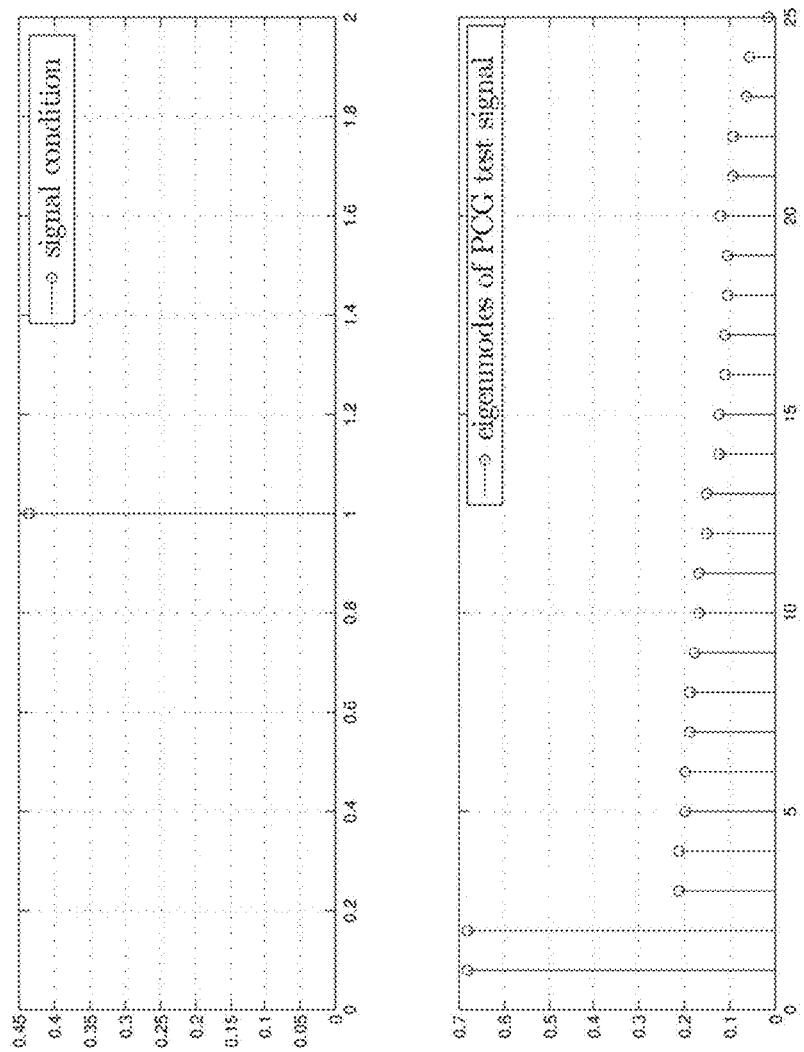
FIG. 5A is a graphical representation illustrates dynamical structure used to evaluate accuracy metric for a test signal according to embodiments of the present disclosure.

FIG. 5A is a graphical representation illustrates dynamical structure used to evaluate accuracy metric for a test signal according to embodiments of the present disclosure. In an embodiment, the graphical representation illustrates the dynamic structure of test signal is expressed in terms of eigenmodes.

Figure 5B:
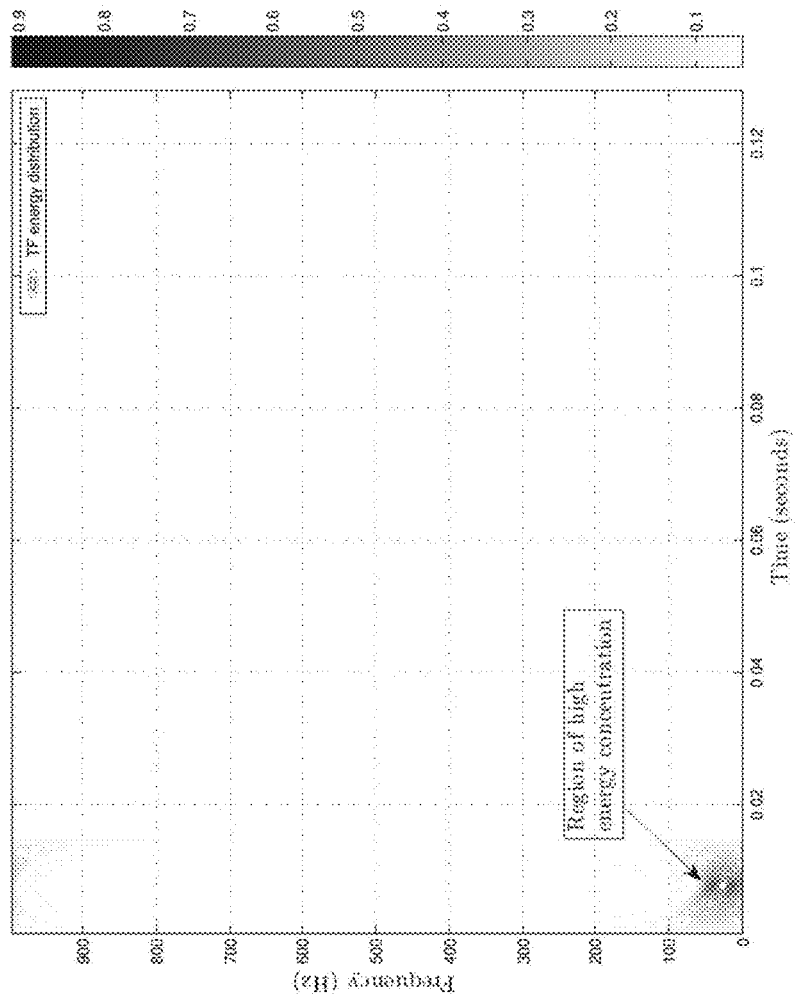
FIG. 5B is a graphical representation illustrates spectral structure imposed on the data model (dictionary) according to embodiments of the present disclosure.

With reference to FIG. 5A, FIG. 5B is a graphical representation illustrates spectral structure imposed on the data model (dictionary) according to embodiments of the present disclosure. In an embodiment, the graphical representation illustrates the spectral structure in terms of a distribution of template signal energy over the time frequency plane.

Figure 5C:
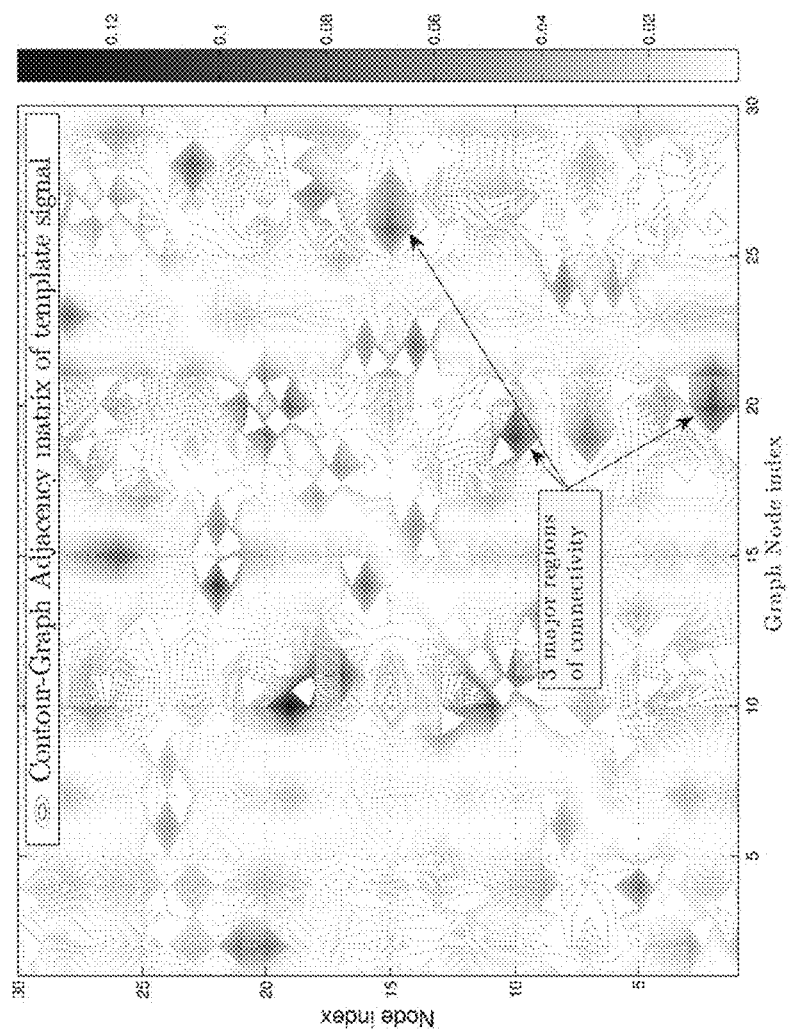
FIG. 5C is a graphical representation illustrates topological structure imposed on the data model (dictionary) according to embodiments of the present disclosure.
Figure 5D:
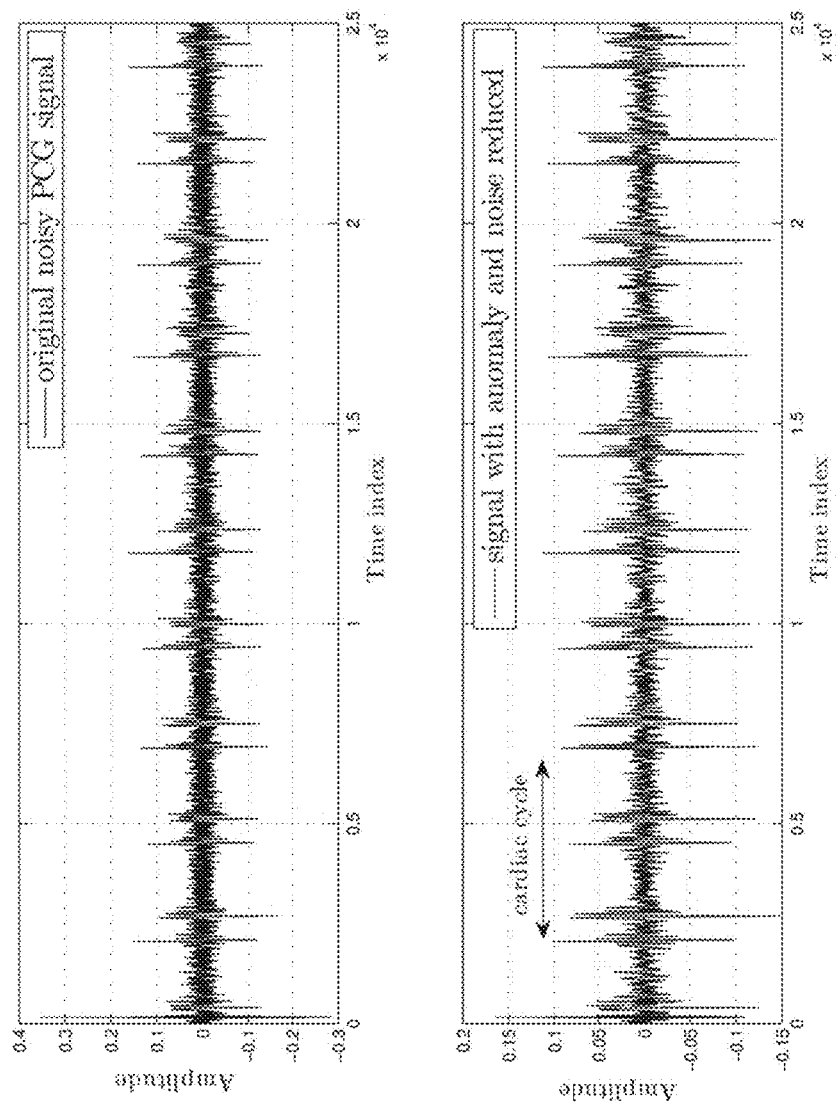
FIG. 5D is a graphical representation illustrates results of denoising and anomaly removal by reconstructing the test signal using spectral and topological structured dictionary according to embodiments of the present disclosure.

With reference to FIGS. 5A and 5B, FIG. 5C is a graphical representation illustrates topological structure imposed on the data model (dictionary) according to embodiments of the present disclosure. In an embodiment, the graphical representation illustrates the topological structure of template signal in terms of a graph adjacency matrix With reference to FIGS. 5A, 5B and 5C, FIG. 5D is a graphical representation illustrates results of denoising and anomaly removal by reconstructing the test signal using spectral and topological structured dictionary according to embodiments of the present disclosure. In an embodiment, the graphical representation illustrates that the original noisy signal (top half of plot) and denoised signal with reduced anomaly (bottom half of plot).

The embodiments of present disclosure herein address unresolved problem of conventional problem of effective determination of inferences on signals. The embodiments of present disclosure enable pre-processing of analog signals, based on data driven models and domain knowledge-based model reconfiguration and restructuring. A joint design of data models and numerically quantified domain knowledge aids in pre-processing of signals in the domains of healthcare or manufacturing. The embodiments of present disclosure address how to incorporate domain dependent features (i.e., statistical, spectral, topological and dynamical structure) into the data model.

Furthermore, the data models are data driven. Iterations between pre-processing and main analytics (using the process-structure-property-performance map) are also emphasized. The embodiments of present disclosure allow a choice of an acceptable range of process parameters for statistically accurate inferences on signals. Domain knowledge-based signal pre-processing enables statistically accurate inferences on data for clinical diagnosis or machine tool diagnosis in a healthcare or manufacturing environment. This enables better efficiency and operational planning for management.

The embodiments of present disclosure propose numerically quantifiable domain dependent metrics/features which can be imposed on the data representation models. The embodiments of present disclosure provide method to derive data driven representational models which can be adapted to the goal to be achieved by the processing algorithms. The embodiments of present disclosure provide a joint design of an objective incorporating the data model and domain dependent statistical/structural features. This joint design enables appropriate pre-processing (e.g., a denoising and an anomaly removal).

The embodiments of present disclosure provides a pre-processing strategy on the raw signal based on deriving a representational model which can be restructured according to the task at hand will be useful for analyzing signals generated by complex physical processes in noisy environments and un-calibrated measurement models.

The embodiments of present disclosure propose a data driven representational model, which is restructured for preserving essential signal properties and structure. This restructured model is then used to reconstruct the desired signal: de-noised/anomalies are removed. The time-frequency and graph-based restructuring is also unique and is a general method applicable for a wide range of analog signals. The embodiments of present disclosure provide a computational framework bridging data and knowledge for automated analysis of complex/unstructured signals. Domain knowledge driven pre-processing are formalized for signals or data.

The embodiments of present disclosure in which while analyzing data, using derived data models, the model parameters are estimated, which can be used to make inferences on the data. An update of the prior knowledge based on data observations helps in making better inferences.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for signal pre-processing based on a plurality of data driven models and a data dependent model transformation, comprising:
receiving a raw signal as an input;
learning a set of representational basis from the received raw signal, wherein the set of representational basis comprises a plurality of orthonormal vectors;

computing a domain dependent time-frequency energy distribution pattern by averaging a plurality of dictionary atoms, wherein the plurality of dictionary atoms is a linear signal space;

selecting at least one orthonormal vector from the plurality of orthonormal vectors based on the computed domain dependent time-frequency energy distribution pattern, wherein the selection of the at least one orthonormal vector corresponds to the plurality of dictionary atoms;

determining a structure of the plurality of dictionary atoms, wherein the structure of the plurality of dictionary atoms corresponds to a graph structure represented as a Laplacian matrix (L);

integrating the graph structure as a structure of the set of representational basis to obtain a reconfigured data model;

reconstructing, using the reconfigured data model, the raw signal to obtain a denoised signal;
  determining a structure of the reconstructed raw signal based on one or more graph structured dictionary atoms, wherein
  constraints on an optimization problem corresponding to a specific spectral and a topological structure of the reconstructed raw signal;

performing a mapping between a process, the structure, a property, and a performance of the denoised signal, wherein
  the process of the denoised signal is a portfolio of algorithms,
  the portfolio of algorithms includes learning the plurality of dictionary atoms, and re-structuring the denoised signal based on spectral and topological properties,
  the structure of the denoised signal defines the property of the denoised signal in terms of accuracy, consistency, completeness, validity, and density,
  the performance is related to estimation, detection, clustering and classification procedures of the denoised signal, and
  the property of the denoised signal is related to inferences on the denoised signal;

determining, based on the mapping, whether an output performance of the signal pre-processing of the raw signal is matching with a threshold performance;

executing, based on a mismatch between the output performance of the signal pre-processing and the threshold performance, a process-structure-property-performance map; and determining, based on the execution of the process-structure-property-performance map, a modification required in a process parameters of the signal pre-processing to match the output performance of the signal pre-processing and the threshold performance.

2. The processor implemented method as claimed in claim 1, wherein the structure of the plurality of dictionary atoms corresponds to a spectral structure and a topological structure of the plurality of dictionary atoms and a topological structure of synthesis coefficients.

3. The processor implemented method as claimed in claim 1, wherein the structure of the reconstructed raw signal is further determined based on time-frequency pattern.

4. The processor implemented method as claimed in claim 1, wherein a penalty factor determines statistical, spectral and the topological structure of reconstructed raw signal encoded in factor lambda $\lambda 2$.

5. The processor implemented method as claimed in claim 4, wherein the penalty factor controls a tradeoff between approximation capability of a dictionary and the topological structure inducing strength of a graph Laplacian penalty.

6. The processor implemented method as claimed in claim 1, wherein reconstruction of the raw signal is further performed by estimating graph structured coefficients of a graph and time-frequency structured dictionary.

7. The processor implemented method as claimed in claim 1, wherein the denoised signal is validated based on a ratio of a sum of major eigenmodes to a sum of minor eigenmodes that is comparable to a domain dependent threshold.

8. A system for signal pre-processing based on a plurality of data driven models and a data dependent model transformation, comprising:
  a memory storing instructions;
  one or more communication interfaces; and
  one or more hardware processors coupled to the memory via the one or more communication interfaces, wherein the one or more hardware processors are configured by the instructions to:
  receive a raw signal as an input;
  learn a set of representational basis from the received raw signal, wherein the set of representational basis comprises a plurality of orthonormal vectors;
  compute a domain dependent time-frequency energy distribution pattern by averaging of a plurality of dictionary atoms, wherein the plurality of dictionary atoms is a linear signal space;
  select at least one orthonormal vector from the plurality of orthonormal vectors based on the computed domain dependent time-frequency energy distribution pattern, wherein the selection of the at least one orthonormal vector corresponds to the plurality of dictionary atoms;
  determine a structure of the plurality of dictionary atoms, wherein the structure of the plurality of dictionary atoms corresponds to a graph structure represented as a Laplacian matrix (L);
  integrate the graph structure as a structure of the set of representational basis to obtain a reconfigured data model;
  reconstruct, using the reconfigured data model, the raw signal, to obtain a denoised signal;
  determine a structure of the reconstructed raw signal based on graph structured dictionary atoms, wherein constraints on an optimization problem to a specific spectral and a topological structure of the reconstructed raw signal;
  perform a mapping between a process, the structure, a property, and a performance of the denoised signal, wherein
    the process of the denoised signal is a portfolio of algorithms,
    the portfolio of algorithms includes learning the plurality of dictionary atoms, and re-structuring the denoised signal based on spectral and topological properties,
    the structure of the denoised signal defines the property of the denoised signal in terms of accuracy, consistency, completeness, validity, and density,
    the performance is related to estimation, detection, clustering and classification procedures of the denoised signal, and
    the property of the denoised signal is related to inferences on the denoised signal;

determine, based on the mapping, whether an output performance of the signal pre-processing of the raw signal is matching with a threshold performance;

execute, based on a mismatch between the output performance of the signal pre-processing and the threshold performance, a process-structure-property-performance map; and determine, based on the execution of the process-structure-property-performance map, a modification required in a process parameters of the signal pre-processing to match the output performance of the signal pre-processing and the threshold performance.

9. The system as claimed in claim 8, wherein the structure of the plurality of dictionary atoms corresponds to a spectral structure and a topological structure of the plurality of dictionary atoms and a topological structure of synthesis coefficients.

10. The system as claimed in claim 8, wherein the structure of the reconstructed raw signal is further determined based on time-frequency pattern.

11. The system as claimed in claim 8, wherein a penalty factor determines statistical, spectral and the topological structure of reconstructed raw signal encoded in factor lambda $\lambda 2$.

12. The system as claimed in claim 11, wherein the penalty factor controls a tradeoff between approximation capability of a dictionary and the topological structure inducing strength of a graph Laplacian penalty.

13. The system as claimed in claim 8, wherein reconstruction of the raw signal is further performed by estimating graph structured coefficients of a graph and time-frequency structured dictionary.

14. The system as claimed in claim 8, wherein the denoised signal is validated based on a ratio of a sum of major eigenmodes to a sum of a minor eigenmodes that is comparable to a domain dependent threshold.

15. One or more non-transitory machine-readable information storage mediums comprising one or more instructions, which when executed by one or more hardware processors cause:

receiving a raw signal as an input;

learning a set of representational basis from the received raw signal, wherein the set of representational basis comprises a plurality of orthonormal vectors;

computing a domain dependent time-frequency energy distribution pattern by averaging of a plurality of dictionary atoms, wherein the plurality of dictionary atoms is a linear signal space;

selecting at least one orthonormal vector from the plurality of orthonormal vectors based on the computed domain dependent time-frequency energy distribution pattern, wherein the selection of the at least one orthonormal vector corresponds to the plurality of dictionary atoms;

determining a structure of the plurality of dictionary atoms, wherein the structure of the plurality of dictionary atoms corresponds to a graph structure represented as a Laplacian matrix (L);

integrating the graph structure as a structure of the set of representational basis to obtain a reconfigured data model;

reconstructing, using the reconfigured data model, the raw signal to obtain a denoised signal;

determining a structure of the reconstructed raw signal is determined based on graph structured dictionary atoms, wherein constraints on an optimization problem corresponds to a specific spectral and a topological structure of the reconstructed raw signal;

performing a mapping between a process, the structure, a property, and a performance of the denoised signal, wherein the process of the denoised signal is a portfolio of algorithms, the portfolio of algorithms includes learning the plurality of dictionary atoms, and re-structuring the denoised signal based on spectral and topological properties, the structure of the denoised signal defines the property of the denoised signal in terms of accuracy, consistency, completeness, validity, and density, the performance is related to estimation, detection, clustering and classification procedures of the denoised signal, and the property of the denoised signal is related to inferences on the denoised signal;

determining, based on the mapping, whether an output performance of the signal pre-processing of the raw signal is matching with a threshold performance;

executing, based on a mismatch between the output performance of the signal pre-processing and the threshold performance, a process-structure-property-performance map; and determining, based on the execution of the process-structure-property-performance map, a modification required in a process parameters of the signal pre-processing to match the output performance of the signal pre-processing and the threshold performance.

16. The one or more non-transitory machine-readable information storage mediums as claimed in claim 15, wherein the structure of the plurality of dictionary atoms corresponds to a spectral structure and a topological structure of the plurality of dictionary atoms and the topological structure of synthesis coefficients.

17. The one or more non-transitory machine-readable information storage mediums as claimed in claim 15, wherein the structure of a reconstructed raw signal is further determined based on time-frequency pattern.

18. The one or more non-transitory machine-readable information storage mediums as claimed in claim 15, wherein a penalty factor determines statistical, spectral and the topological structure of reconstructed raw signal encoded in factor lambda $\lambda 2$, wherein the penalty factor controls a tradeoff between approximation capability of a dictionary and structure inducing strength of a graph Laplacian penalty.

19. The one or more non-transitory machine-readable information storage mediums as claimed in claim 15, wherein reconstruction of the raw signal is performed by estimating graph structured coefficients of a graph and time-frequency structured dictionary.

20. The one or more non-transitory machine-readable information storage mediums as claimed in claim 15, wherein the denoised signal is validated based on a ratio of a sum of major eigenmodes to a sum of minor eigenmodes that is comparable to a domain dependent threshold for clean signals in the domain.

* * * * *